US008023214B2

(12) United States Patent
Yanagisawa et al.

(10) Patent No.: US 8,023,214 B2
(45) Date of Patent: Sep. 20, 2011

(54) REWORK METHOD AND APPARATUS OF MAGNETIC RECORD MEDIUM, INFORMATION

(75) Inventors: Takumi Yanagisawa, Tokyo (JP); Satoshi Miura, Tokyo (JP)

(73) Assignee: TDK Corporation, Tokyo (JP)

( * ) Notice: Subject to any disclaimer, the term of this patent is extended or adjusted under 35 U.S.C. 154(b) by 135 days.

(21) Appl. No.: 12/585,259

(22) Filed: Sep. 10, 2009

(65) Prior Publication Data

US 2011/0058270 A1 Mar. 10, 2011

(51) Int. Cl.
*G11B 27/36* (2006.01)

(52) U.S. Cl. ............................................ 360/31; 360/75

(58) Field of Classification Search ........................ None
See application file for complete search history.

(56) References Cited

U.S. PATENT DOCUMENTS 6,967,810 B2 11/2005 Kasiraj et al.
7,394,607 B2 7/2008 Ohno et al.
7,408,731 B2 8/2008 Uemura et al.
7,440,221 B2 10/2008 Tsuchinaga et al.
7,486,460 B2 2/2009 Tsuchinaga et al.
7,490,212 B2 2/2009 Kasiraj et al.
7,746,589 B2 * 6/2010 Min et al. ........................ 360/48
2005/0122609 A1 * 6/2005 Albrecht et al. ................ 360/55
2010/0238584 A1 * 9/2010 Messner et al. ................. 360/75

FOREIGN PATENT DOCUMENTS

JP A-11-272566 10/1999

* cited by examiner

*Primary Examiner* — Jason Olson
(74) *Attorney, Agent, or Firm* — Posz Law Group, PLC

(57) ABSTRACT

A reproducing method of reproducing magnetic information written in each of bits of a recording medium using a magnetic head having a reading element configured to measure external magnetic field intensity includes moving, measuring and specifying steps. In the moving step, the magnetic head moves to a position where the reading element covers two bits, one bit having known magnetic information, the other bit being adjacent to the one bit and having unknown magnetic information. In the measuring step, the reading element measures magnetic field intensity coming from the recording medium. In the specifying step, magnetic information of the bit having the unknown magnetic information is specified based on the magnetic field intensity measured in the measuring step and magnetic information of the bit having the known magnetic information.

17 Claims, 9 Drawing Sheets

REWORK METHOD AND APPARATUS OF MAGNETIC RECORD MEDIUM, INFORMATION

BACKGROUND OF THE INVENTION

1. Field of the Invention

The present invention relates to a rework method and apparatus (or reproducing method and apparatus) of reproducing magnetic information written in a record medium (or recoding medium).

2. Description of the Related Art

Various devices such as a personal computer, a music player, and the like are equipped with a recording medium such as, for example, a hard disk. In recent years, the recording medium described above has been developed with a high recording density.

Specifically, writing magnetic information in the recording medium by a shingle write technology may result in a narrowed recording track width of the recording medium (see, for example, Japanese laid-open patent application publication number 2006-294162). In the shingle write technology, magnetic information of one track is overlappingly written in a portion of an adjacent track with respect to a track width direction (a direction orthogonal to the track direction). As a result, the recording medium records the magnetic information with a small track pitch. Therefore, the recording density of the recording medium is improved.

As described above, the magnetic information written in the recording medium is read by a reading element of a magnetic head, and is reproduced. The reading element detects a magnetic direction of each bit of the recording medium. With the configuration, the magnetic head reads the magnetic information written in each bit of the recording medium.

However, when the reading element of the magnetic head is wider than a width of each bit of the recording medium, the reading element is affected by a magnetic field generated from adjacent bits, so that it is occasionally impossible to accurately read the magnetic information of specified bits. Therefore, as the width of each bit of the recording medium becomes narrower, reproducing the magnetic information becomes more difficult.

As a result, it is desired to provide a reproducing method and reproducing apparatus for reading the magnetic information written in a recording medium with a narrow read gap.

SUMMARY OF THE INVENTION

The object of the present invention is to provide a reproducing method and apparatus for reading magnetic information written in a recording medium with a narrow read gap.

In a reproducing method of one embodiment of the present invention, magnetic information written in each of bits of a recording medium is read using a magnetic head having a reading element configured to measure external magnetic field intensity. The reproducing method includes moving, measuring and specifying steps. In the moving step, the magnetic head moves to a position where the reading element covers two bits, one bit having known magnetic information, the other bit being adjacent to the one bit and having unknown magnetic information. In the measuring step, the reading element measures magnetic field intensity coming from the recording medium. In the specifying step, magnetic information of the bit having the unknown magnetic information is specified based on the magnetic field intensity measured in the measuring step and magnetic information of the bit having the known magnetic information.

Further, a reproducing apparatus of one embodiment reproduces magnetic information written in each bit of a recording medium, having a magnetic head having a reading element configured to measure external magnetic field intensity, a positioning apparatus configured to position the magnetic head with respect to the recording medium. The positioning apparatus is configured to move to cover bits, one bit having known magnetic information, the other bit being adjacent to the one bit and having unknown magnetic information. The reproducing apparatus further includes an information processing part specifying magnetic information of the bit having the unknown magnetic information based on the magnetic field intensity measured by the reading element and the magnetic information of the bit having the known magnetic information.

According to the present invention, in a state where the reading element of the magnetic head covers bits adjacent to each other, magnetic information of the bit that has unknown magnetic information (or information that has not been read yet) is reproduced. Therefore, even if a width of the bit having the magnetic information that has not been read is narrower than a sensing region of the reading element, the magnetic information can be reproduced.

The above-mentioned object, as well as other objects, characteristics, and advantages of the present invention will be described below in more detail with reference to attached drawings illustrating an embodiment of the present invention.

DETAILED DESCRIPTION OF THE INVENTION

Hereafter, a reproducing apparatus according to one embodiment of the present invention will be explained with reference to the drawings.

Figure 1:
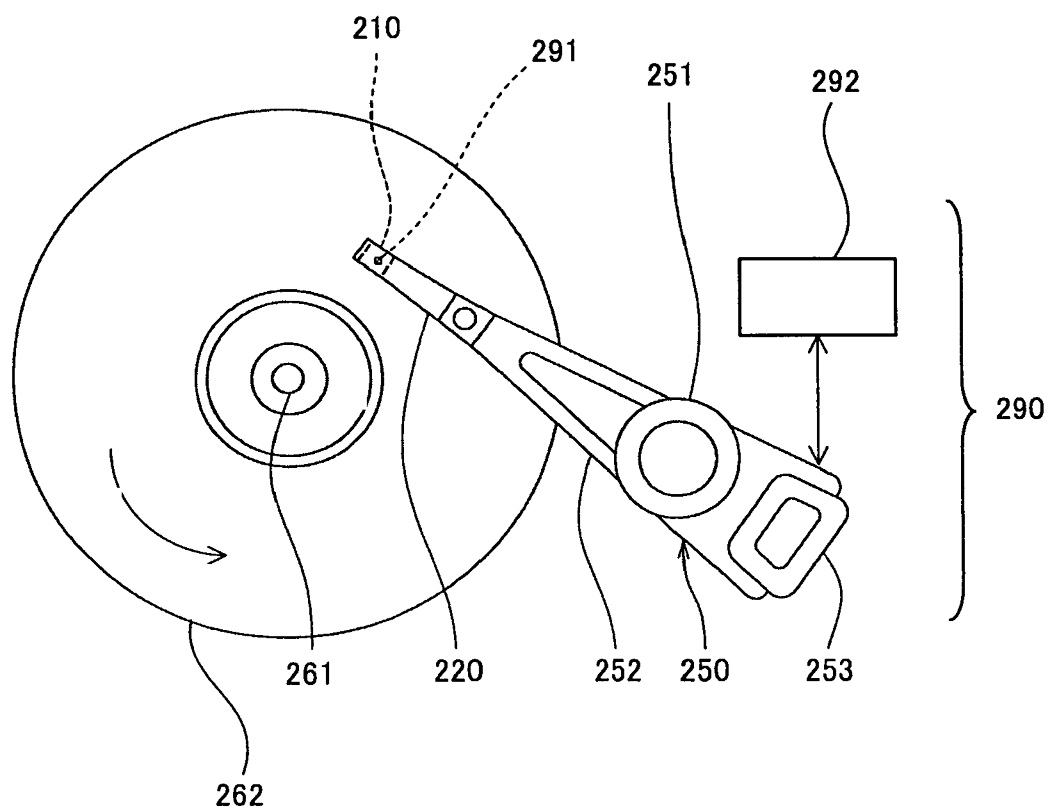
FIG. 1 is a schematic view illustrating a configuration of the reproducing apparatus according to one embodiment.

FIG. 1 is a schematic view illustrating a configuration of the reproducing apparatus according to one embodiment. A reproducing apparatus 290 has a magnetic head 291, a positioning apparatus 250, and an information processing part 292. The magnetic head 291 has a reading element configured to measure external magnetic field intensity. The positioning apparatus 250 positions the magnetic head 291 corresponding to a recording medium. The information processing part 292 processes an output from the reading element.

The reading element is preferred to have a magnetoresistive effect element (MR element). A resistance value of the MR element varies according to an external magnetic field. Accordingly, the resistance value of the MR element varies according to a magnetic direction and magnetic intensity of each bit of a recording medium 262. Detecting the resistance value of the MR element enables the reading element to read the magnetic information written in the recording medium 262. To the extent that the reading element is able to detect a magnetic field generated from the recording medium, the reading element may include another element other than the MR element.

The reproducing apparatus 290 of the present embodiment is preferably used as an apparatus to reproduce magnetic information. The magnetic information is binary information in correspondence with a magnetic direction of each bit of the recording medium.

Hereafter, the information processing part 292 of the reproducing apparatus 290, the positioning apparatus 250, along with a reproducing method of the magnetic information of the recording medium 262, will be explained.

Figure 2:
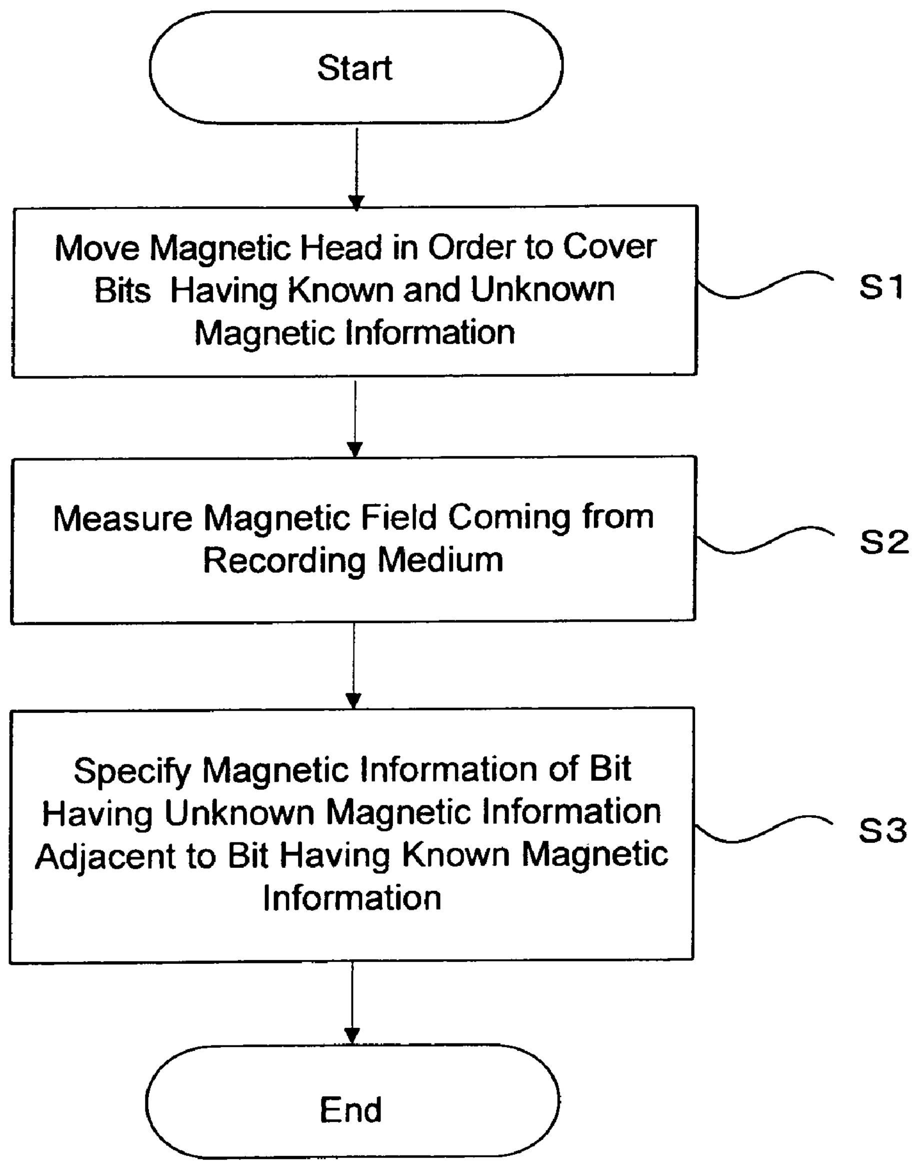
FIG. 2 is a flow diagram of the reproducing method according to one embodiment.
Figure 3:
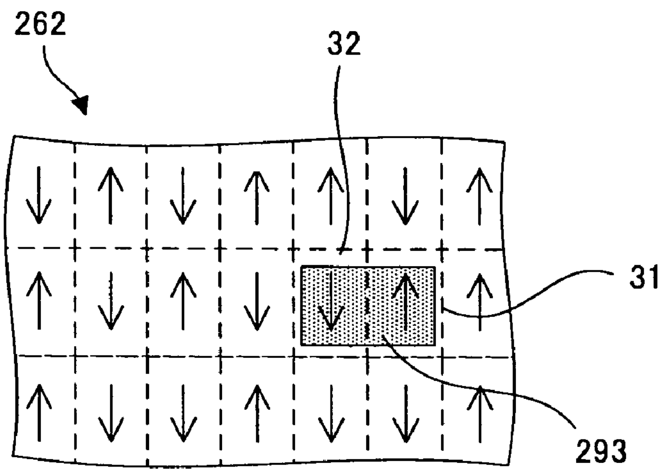
FIG. 3 is a pattern diagram illustrating a state where the reading element is positioned in a standard position to cover a first bit and a second bit.

FIG. 2 is a flow diagram of a reproducing method of magnetic information of one embodiment. In the reproducing method, at first, as shown in FIG. 3, the magnetic head moves in order that a reading element 293 of the magnetic head is set in a standard position. In the standard position, the reading element 293 is covering a first bit 31 that has known magnetic information (or information that has already been read), and a second bit 32 that has unknown magnetic information (or information that has not been read yet) and that is adjacent to the first bit 31 (S1).

FIG. 3 shows a portion of a surface of the recording medium 262, and the surface facing the magnetic head. Dotted lines in FIG. 3 are lines indicating boundaries of bits. These bits are defined as minimum units to record magnetic information. Magnetic directions of all bits in the drawing are shown by arrows.

Magnetization directions of each bit may be perpendicular with respect to the recording medium (a perpendicular magnetic recording system), or may be horizontal with respect to the recording medium (a horizontal magnetic recording system). In view of high density recording, the perpendicular magnetic recording system is preferable.

The above-described positioning apparatus 250 controls a movement of the magnetic head 291. The second bit 32 may be arranged side-by-side with the first bit 31 with respect to a track direction (a direction along a recording track) of the recording medium 262, or may be arranged with the first bit 31 with respect to a track crossing direction, which is orthogonal to the track direction.

Then, at the standard position, the reading element 293 measures a magnetic field generated from the recording medium 262 (S2). A sensing region of the reading element 293 is almost the same as an element width of the reading element. The sensing region is defined as a region where an external magnetic field is detected.

Because the reading element 293 covers the first bit 31 and the second bit 32, the reading element 293 is affected by the both magnetic fields of the first bit 31 and the second bit 32. In other words, when a magnetization of the first bit 31 and a magnetization of the second bit 32 are arranged in the same direction, the reading element 293 detects a strong magnetic field in the same direction as the magnetization directions of the bits. On the other hand, when the magnetizations of the first bit 31 and the second bit 32 are arranged in opposite directions to each other, because magnetic field intensities of these bits on the reading element 293 are canceled, the reading element 293 detects a slight magnetic field. In such a case, an output value of the reading element 293 is, almost, an average value of magnetic field intensities of the first bit 31 and the second bit 32.

Figure 4:
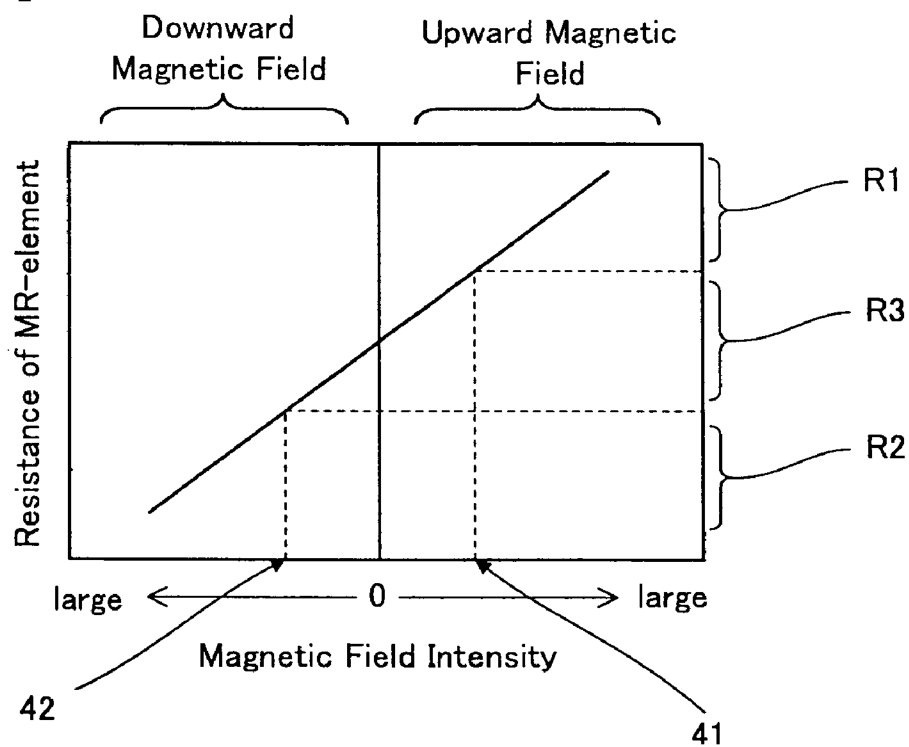
FIG. 4 is a graph illustrating a relationship between a resistance value of a magnetoresistance (MR) element of the reading element and an external magnetic field.

Therefore, when the magnetization of the first bit 31 and the magnetization of the second bit 32 are arranged in the same direction, the output value of the reading element 293 generally becomes a nearly maximum or minimum value (state R1 or state R2 in FIG. 4). On the other hand, when the magnetization of the first bit 31 and the magnetization of the second bit 32 are arranged relative to each other in opposite directions, the output value of the reading element 293 becomes a nearly intermediate value (state R3 in FIG. 4).

Then, the magnetic information of the second bit 32 is specified based on the magnetic field intensity and the magnetic information of the first bit 31 (S3), the magnetic field intensity being measured by the reading element 293 at the standard position. The information processing part 292 of the magnetic head specifies the magnetic information of the second bit 32.

Specifically, when the magnetic field intensity measured by the reading element 293 is larger than threshold values 41 and 42 that are previously set, the information processing part 292 determines that the magnetic information of the second bit 32 is the same as the magnetic information of the first bit 31. On the other hand, when the magnetic field intensity measured by the reading element 293 is smaller than the threshold values 41 and 42 that are previously set, the information processing part 292 determines that the magnetic information of the second bit 32 is different from the magnetic information of the first bit 31.

Herein, because the magnetic information of the first bit 31 is known, the information processing part 292 specifies the magnetic information of the second bit 32.

Figure 5:
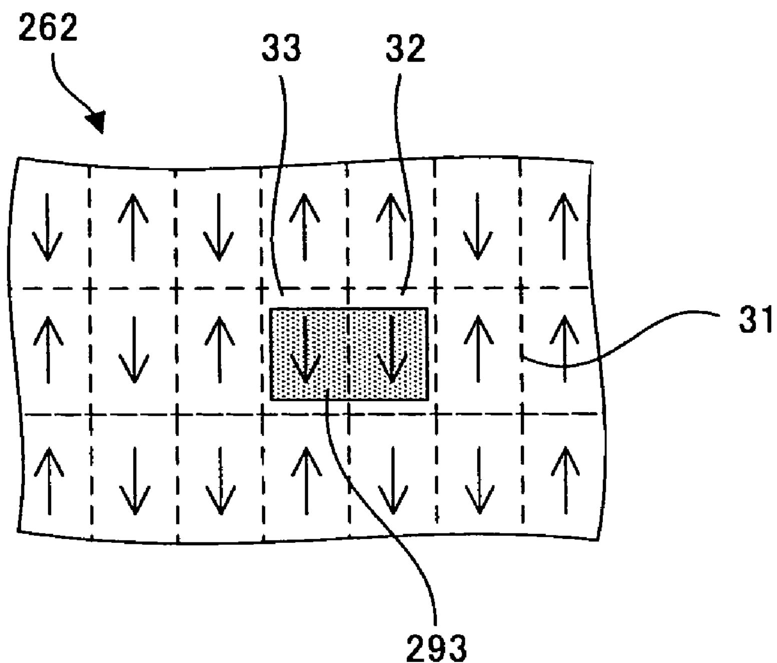
FIG. 5 is a schematic view illustrating a state where the reading element is positioned to cover the second bit and a third bit.

Hereafter, magnetic information of a third bit 33, which is adjacent to the second bit 32, may be specified by the above-described method. Namely, as shown in FIG. 5, the magnetic head 291 moves to a position where the reading element 293 covers the second bit 32 and the third bit 33, and then, the reading element 293 measures a magnetic field generated from the recording medium 262 in the position. As the magnetic information of the second bit 32 is known (read previously), the information processing part 292 specifies the magnetic information of the third bit 33.

Just after the magnetic information of the second bit 32 is specified, the magnetic information of the third bit 33 may be read. Aside from this, the magnetic information of the second bit 32 is specified, and magnetic information of other bit is read, and after that, the magnetic information of the third bit 33 may be read.

Accordingly, by repeating the above-described reproducing method, the magnetic information of the recording medium 262 is entirely reproduced.

According to the present invention, in the state where the reading element 293 of the magnetic head covers the first bit 31 and the second bit 32, the magnetic information is reproduced. Thereby, with respect to the direction along which the first bit 31 and the second bit 32 are arranged, the magnetic information of the second bit 32 can be reproduced even if the width of the second bit 32 is narrower than the sensing region of the reading element 293. Specifically, even if the bit width of the recording medium 262 is approximately half of the sensing region of the reading element 293, the magnetic information written in the recording medium can be reproduced.

When the magnetic information is reproduced with the MR element, the information processing part 292 is preferably configured to identify three states corresponding to a resistance value of the MR element (see FIG. 4). In first state R1, the external magnetic field is upward, and the magnetic field intensity is larger than the predetermined threshold value. In second state R2, the external magnetic field is downward, and the magnetic field intensity is larger than the predetermined threshold value. In third state R3, the magnetic field intensity is smaller than the predetermined threshold value.

Therefore, the information processing part 292 distinguishes the following three states. One is the state where magnetization directions of bits adjacent to each other are upward, another is the state where magnetization directions of the bits adjacent to each other are downward, and the other is the state where magnetization directions of the bits adjacent to each other are directed in opposite directions.

In order to reproduce the magnetic information written in an arbitrary bit of the recording medium 262 using the above-described reproducing method, it is required that magnetic information of a specified bit that functions as a standard point can be specified. Hereinafter, the specified bit is referred to as a standard bit.

In order to achieve this, the magnetic information of the standard bit may be previously regulated. In this instance, when the magnetic information is written in the recording medium 262, the regulated magnetic information is recorded in the standard bit. Accordingly, the magnetic information of the standard bit becomes known.

Figure 6:
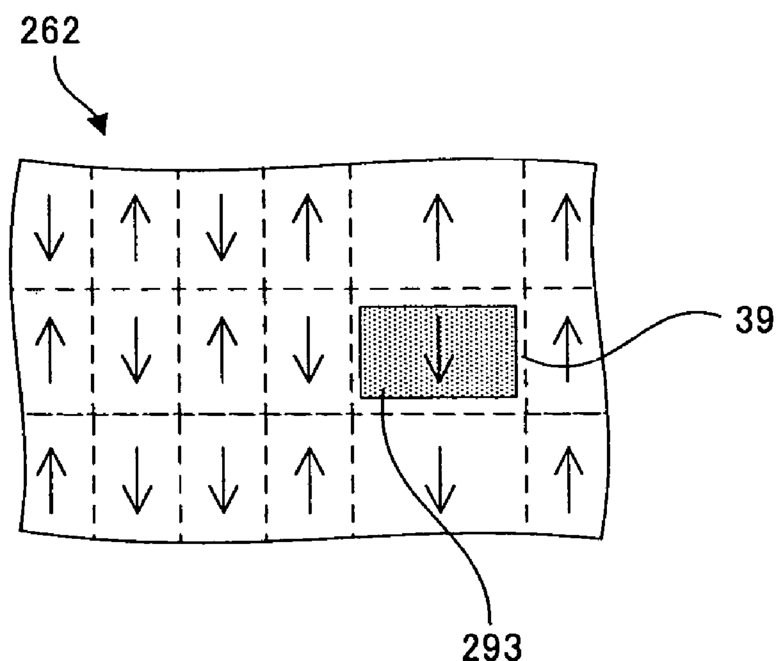
FIG. 6 is a schematic view illustrating a state where the reading element is positioned on a reproducible standard bit.

Apart from the above configuration, the reproducing apparatus 290 may specify the magnetic information of the standard bit. For example, it is considered to make a width of the standard bit wider than the sensing region of the reading element 293. In this instance, as shown in FIG. 6, when a reading process starts, the magnetic head 291 is moved to a position where the reading element 293 is set above the standard bit 39. The magnetic information of the standard 39 is read at the position. The width of remaining bits except for the standard bit 39 may be narrower than the sensing region of the reading element 293.

With such a configuration, it is preferable that a bit from which the magnetic head starts reading the magnetic information is at least the standard bit.

It is preferable that a plurality of the standard bits 39 are present on the recording medium. For example, all of the bits on one track of the recording medium 262 may be the standard bits. On the other hand, the standard bits may be arranged in the track crossing direction. In order not to take much time to reproduce magnetic information of a target bit (another bit to be read next) from a standard bit, the standard bits are preferred to be arranged with proper intervals.

Figure 7:
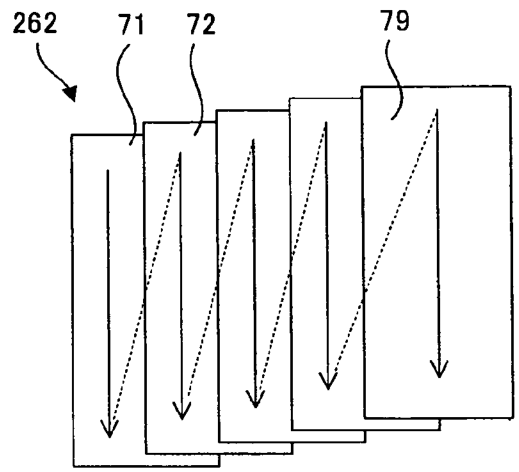
FIG. 7 is a schematic view illustrating a manner that magnetic information is written in the recording medium using the shingle write technology.

With the reproducing apparatus and reproducing method of the present embodiment, the magnetic information of the recording medium written by the shingle write technology is suitably reproduced. FIG. 7 shows a manner that magnetic information is written in a recording medium 262 using the shingle write technology. Arrows in the figure show orders to write the magnetic information.

According to the shingle write technology, after writing magnetic information in a first track 71, magnetic information is written in a second track 72 that is adjacent to the first track 71. When the magnetic information is written in the second track 72, the magnetic information is overlappingly written in one portion of the magnetic information written in the first track 71. Therefore, a width (a track width) in the track crossing direction of the first track 71 becomes substantially narrower.

Writing the magnetic information in an adjacent track sequentially in the above manner makes a track width of each track narrower. However, a track width of a track 79 which is written last is wider than other track widths.

Figure 8:
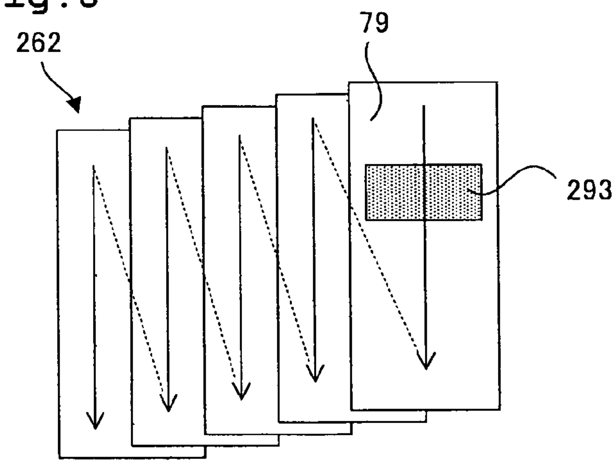
FIG. 8 is one schematic view illustrating a manner of reproducing the magnetic information of the recording medium. The magnetic information is written by the shingle write technology.

In the reproducing method and reproducing apparatus of the present embodiment, a bit of the wide width track 79, being written last, is preferably used as the standard bit. In other words, at first, as shown in FIG. 8, the magnetic head 291 is moved to set the reading element 293 above the wide width track 79. Then, the magnetic information written in each bit on the wide width track 79 is read, and the information processing part 292 records the magnetic information.

Figure 9:
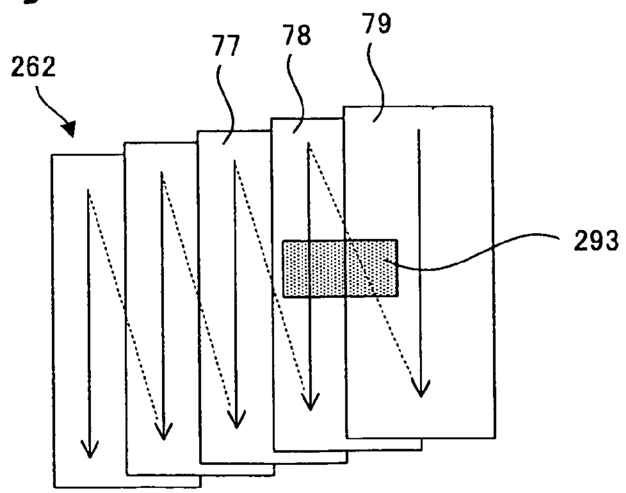
FIG. 9 is one schematic view illustrating a manner of reproducing the magnetic information of the recording medium. The magnetic information is written by the shingle write technology.

After that, as shown in FIG. 9, the magnetic head is moved to a standard position where the reading element 293 covers the wide width track 79 and a track 78 adjacent to the wide width track 79. In the standard position, the reading element 293 measures a magnetic field that comes from the recording medium 262. Simultaneously, the reading element 293 is influenced by the magnetic field generated from both of the track 78 and 79, which are adjacent to each other.

The information processing part 292 specifies magnetic information of each bit on the track 78 based on known magnetic information of each bit on the wide width track 79 and a detected value of the reading element 293 in the standard position. Hereafter, in the same manner, magnetic information of each bit on a track 77 adjacent to the track 78 is further reproduced.

Figure 10:
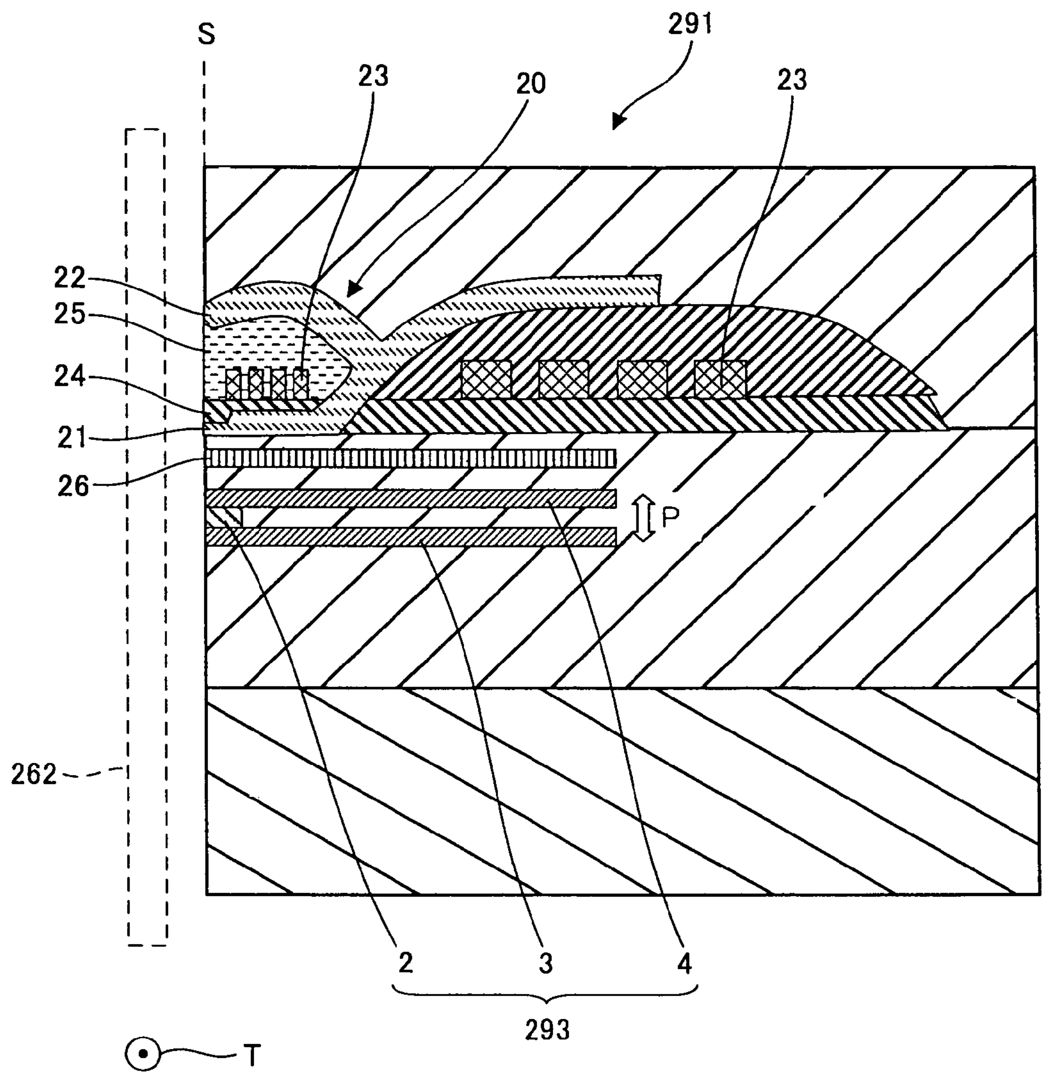
FIG. 10 is a side sectional view of the magnetic head of the reproducing apparatus according to one embodiment.

Next, a detailed configuration of the magnetic head 291 of which the reproducing apparatus 290 of the above-described embodiment has will be explained. Hereafter, with reference to FIG. 10, the magnetic head 291 will be explained. The magnetic head 291 has a function of writing magnetic information in the recording medium 262 as one example.

The magnetic head 291 has a writing element 20 and the reading element 293. The writing element 20 writes magnetic information to the recording medium 262. The reading element 293 reads the magnetic information written in the recording medium 262.

The reading element 293 has an MR element 2, and first and second shield layers 3 and 4. The first and second shield layers 3 and 4 are disposed sandwiching the MR element 2 in a film surface orthogonal direction P of the MR element 2. The MR element 2 has a magnetoresistive effect, and may be configured with any film configuration. For example, the MR element 2 may be a spin-valve type element.

The writing element 20 is disposed on the second shield layer 4 through an interelement shield layer 26 formed by, for example, a sputtering method. The writing element 20 has a configuration for the so-called perpendicular magnetic recording. A magnetic pole layer for writing is configured with a main magnetic pole layer 21 and an auxiliary magnetic pole layer 22. These magnetic pole layers 21 and 22 are formed by a frame plating method or the like. The main magnetic pole layer 21 is made of, for example, FeCo, is exposed to an air bearing surface (ABS) S, and is emitted to a direction that is almost orthogonal to the ABS S. A coil layer 23 is wound around the main magnetic pole layer 21, and extends over a gap layer 24 that is made of an insulating material. The magnetic flux is induced to the main magnetic pole layer 21 by the coil layer 23. Herein, the ABS S is one surface of the magnetic head 291 that faces the recording medium 262, when a signal of the recording medium 262 is read.

The coil layer 23 is formed by the frame plating method or the like. The magnetic flux is guided through the inside of the main magnetic pole layer 21 and is emitted toward the recording medium 29 from the ABS S. The main magnetic pole layer 21 is narrowed near the ABS S not only in the film surface orthogonal direction P but also in the track crossing direction T (a direction that is orthogonal to the paper surface of FIG. 10). Therefore, it generates a minute and strong writing magnetic field that is suitable for high recording density.

The auxiliary magnetic pole layer 22 is a magnetic layer that is magnetically connected with the main magnetic pole layer 21. The auxiliary magnetic pole layer 22 is preferably a magnetic pole layer with a layer thickness of approximately 0.01 to 0.5 μm and is formed by an alloy that is made of, for example, either two or three of the following materials: Ni; Fe; and Co. The auxiliary magnetic pole layer 22 is branched from the main magnetic pole layer 21 and faces the main magnetic pole layer 21 through a gap layer 24 and a coil insulating layer 25 on the ABS S side. The edge portion of the auxiliary magnetic pole layer 22 on the side of the ABS S forms a trailing shield part of which the layer cross section in the edge portion is larger than other portions of the auxiliary magnetic pole layer 22. Because of disposing the auxiliary magnetic pole layer 22, the magnetic field gradient between the auxiliary magnetic pole layer 22 and the main magnetic pole layer 21 is precipitous in the vicinity of the ABS S. As a result, signal output jitter is small, and error rate of reading is small.

Figure 11:
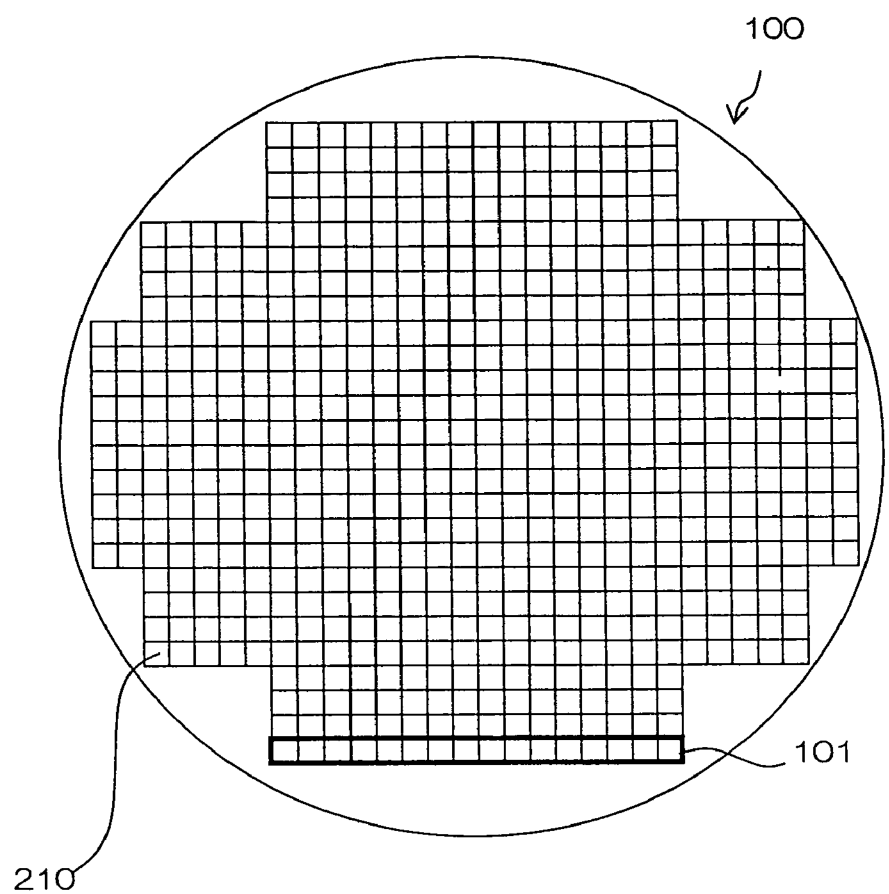
FIG. 11 is a top plan view of a wafer with respect to manufacture of the magnetic head.

Next, a wafer used for manufacturing the above mentioned thin film magnetic head is described below. As shown in FIG. 11, on a wafer 100 is formed the MR element configuring, at least, the above mentioned thin film magnetic head. The wafer 100 is divided into a plurality of bars 101, which are work units for polishing the ABS. After polishing, the bar 101 is cut, and is divided into sliders 210 each containing a thin film magnetic head. The wafer 100 is disposed with cutting margins (not shown) used for cutting the wafer 100 into the bars 101 and the bars 101 into the sliders 210.

Figure 12:
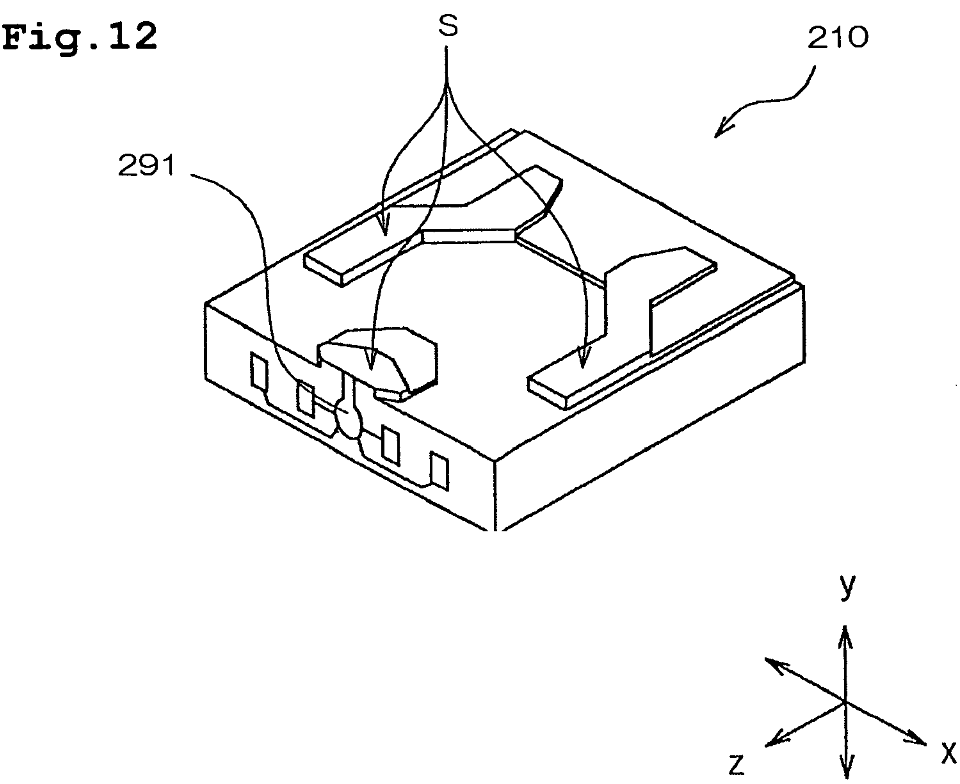
FIG. 12 is a perspective view of a slider of the reproducing apparatus according to one embodiment.

Referring to FIG. 12, the slider 210 is substantially hexahedron-shaped. One face thereof is the ABS S that faces a recording medium such as a hard disk.

Figure 13:
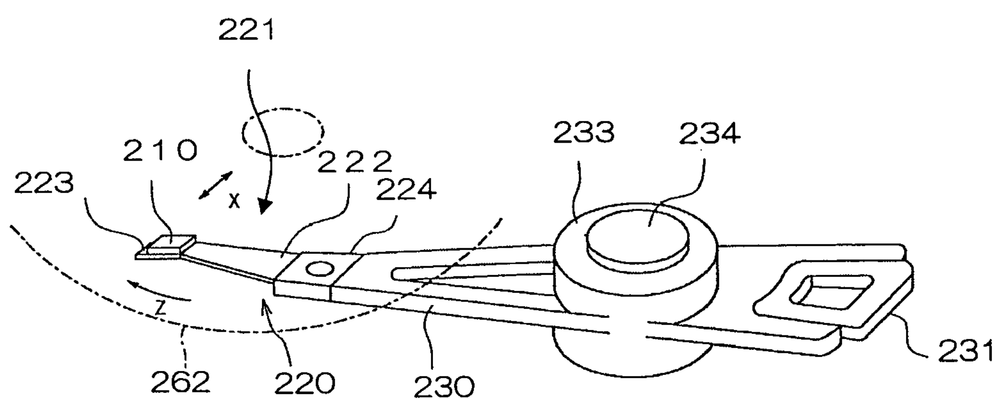
FIG. 13 is a perspective view of a head arm assembly including a head gimbal assembly assembled with the slider.

Referring to FIG. 13, a head gimbal assembly 220 includes the slider 210 and a suspension 221 for elastically supporting the slider 210. The suspension 221 includes a spring-set load beam 222 made of, for example, stainless steel, a flexure 223 disposed on one edge of the load beam 222 and a base plate 224 disposed on the other edge of the load beams 222. The flexure 223 is disposed to contact with the slider 210, giving a proper degree of freedom to the slider 210. On the section in which the slider 210 is mounted on the flexure 223, a gimbal part is provided for constantly keeping the position of the slider 210.

The slider 210 is placed inside the reproducing apparatus 290, facing a hard disk 262, which is a disk-shaped recording medium to be rotated. At a time when a hard disk is rotated in the z-direction in FIG. 13, airflow passing through the space between the hard disk 262 and the slider 210 occurs lift force for the slider 210 downward in the y-direction. The slider 210 is moved away from the surface of the hard disk by the lift force. The magnetic head 291 is formed in the area near the edge portion on the air exit side (i.e., the edge portion on the lower left side in FIG. 12) of the slider 210.

The portion in which the head gimbal assembly 220 is mounted on an arm 230 is referred to as a head arm assembly. The arm 230 allows moving the slider 210 in the track crossing direction x of the hard disk 262. One edge of the arm 230 is mounted on the base plate 224. On the other edge of the arm 230, a coil 231 is mounted, which constitutes part of the voice coil motor. A bearing part 233 is disposed in the middle section of the arm 230. The arm 230 is rotatably supported by a shaft 234 mounted on the bearing part 233. The arm 230 and the voice coil motor for driving the arm 230 constitute an actuator.

Figure 14:
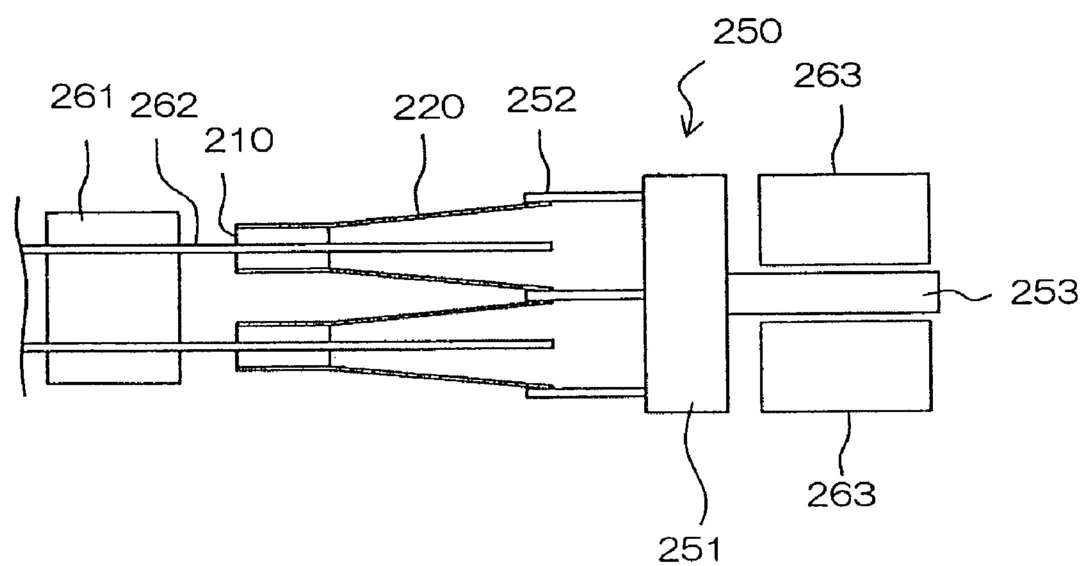
FIG. 14 is a side view of the head arm assembly assembled with the slider.

Next, descriptions of a head stack assembly into which the above-mentioned slider 210 is integrated and of the reproducing apparatus 290 are given below with reference to FIG. 14 and FIG. 1. The head stack assembly includes a carriage 251 having a plurality of arms 252, wherein a head gimbal assembly 220 is mounted on each arm. FIG. 14 is a side view of the head stack assembly. The head stack assembly 250 includes a carriage 251 having a plurality of arms 252. On each arm 252, head gimbal assemblies 220 are mounted at an interval in the vertical direction. On the side of the carriage 251 opposite to the arm 252, a coil 253 is mounted, which constitutes part of a voice coil motor. The voice coil motor has permanent magnets 263 disposed facing each other on both sides of the coil 253.

As shown in FIG. 1, the head stack assembly 250 is integrated into the reproducing apparatus 290. The reproducing apparatus 290 has multiple hard disks 262 mounted on a spindle motor 261. For each hard disk 262, two sliders 210 are disposed facing each other on both sides of the hard disk 262. The head stack assembly 250, excluding the slider 210, and an actuator, which corresponds to the positioning apparatus according to the present invention, not only supports the slider 210 but also positions the slider 210 with respect to the hard disk 262. The slider 210 is moved in the track crossing direction of the hard disk 262 by means of the actuator to be positioned with respect to the hard disk 262. The magnetic head 291 of the slider 210 records information on the hard disk 262 by means of a writing element and reproduces information recorded in the hard disk 262 by means of a reading head.

The above-described reproducing apparatus 290 is a hard disk apparatus with a function that reads and writes the magnetic information to a hard disk functioning as the recording medium. However, a reproducing apparatus of the present invention may be not only the hard disk drive, but also an apparatus with only a reproducing function.

A description of the preferred embodiment according to the present invention was given above in detail. However, it should be appreciated that a wide variety of alterations and modifications are possible as far as they do not depart from the spirit and scope of the attached claims.

What is claimed is:

1. A reproducing method of reproducing magnetic information written in each of bits of a recording medium using a magnetic head having a reading element configured to measure external magnetic field intensity, comprising:

a moving step in which the magnetic head moves to a position where the reading element covers two bits, one bit having known magnetic information, the other bit being adjacent to the one bit and having unknown magnetic information;

a measuring step in which the reading element measures magnetic field intensity coming from the recording medium; and a specifying step in which magnetic information of the bit having the unknown magnetic information is specified based on the magnetic field intensity measured in the measuring step and magnetic information of the bit having the known magnetic information.

2. The reproducing method according to claim 1, wherein the magnetic information written in the recording medium is binary information corresponding to a magnetization direction of each bit.

3. The reproducing method according to claim 2, wherein the magnetic information of the bit having the unknown magnetic information is specified as different from the magnetic information of the bit having the known magnetic information when the measured magnetic field intensity is smaller than a predetermined threshold value.

4. The reproducing method according to claim 3, wherein the magnetic information of the bit having the unknown magnetic information is specified as same as the magnetic information of the bit having the known magnetic information when the measured magnetic field intensity is equal to or larger than the predetermined threshold value.

5. The reproducing method according to claim 1, wherein the magnetic information of the bit having the known magnetic information is previously regulated.

6. The reproducing method according to claim 1, wherein the bit having the known magnetic information is larger than a width of the reading element, and the magnetic information is specified by moving the magnetic head to a position where the reading element is positioned above the bit having the known magnetic information, and by the reading element measuring the magnetic field intensity coming from the bit.

7. The reproducing method according to claim 1, wherein a width of the bit having the unknown magnetic information is smaller than a width of the reading element with respect to a direction along which the two bits adjacent to each other are arranged, the reading element covering the two bits.

8. The reproducing method according to claim 1, wherein the two bits adjacent to each other, the reading element covering the two bits, are adjacently arranged in a track crossing direction that is perpendicular to a track direction that is along tracks on the recording medium.

9. The reproducing method according to claim 1, wherein the two bits adjacent to each other, the reading element covering the two bits, are adjacently arranged in a track direction that is along tracks on the recording medium.

10. The reproducing method according to claim 1, wherein the reading element is configured with a magnetoresistive effect element of which a resistance value varies according to magnetic field intensity and a direction of a magnetic field.

11. The reproducing method according to claim 1, further comprising after the specifying step:

the measuring step and the specifying step in a state where the magnetic head is moved by a single bit in order to cover the bit of which the magnetic information was specified in the specifying step and another bit adjacent to the bit, whereby magnetic information of the another bit is further specified, the another bit being adjacent to the bit of which the magnetic information was specified in the specifying step.

12. A reproducing apparatus of reproducing magnetic information written in each bit of a recording medium, comprising:

a magnetic head having a reading element configured to measure external magnetic field intensity, a positioning apparatus configured to position the magnetic head with respect to the recording medium, wherein the positioning apparatus is configured to move to cover bits, one bit having known magnetic information, the other bit being adjacent to the one bit and having unknown magnetic information; and an information processing part specifying magnetic information of the bit having the unknown magnetic information based on the magnetic field intensity measured by the reading element and the magnetic information of the bit having the known magnetic information.

13. The reproducing apparatus according to claim 12, wherein the magnetic head is configured to reproduce binary information corresponding to a magnetization direction of each bit of the recording medium.

14. The reproducing apparatus according to claim 13, wherein the information processing part specifies the magnetic information of the bit having the unknown magnetic information as different from the magnetic information of the bit having the known magnetic information when the measured magnetic field intensity is smaller than a predetermined threshold value.

15. The reproducing apparatus according to claim 14, wherein the information processing part specifies the magnetic information of the bit having the unknown magnetic information as same as the magnetic information of the bit having the known magnetic information when the measured magnetic field intensity is equal to or larger than the predetermined threshold value.

16. The reproducing apparatus according to claim 12, wherein a width of the reading element is smaller than a width of the bit having the unknown magnetic information with respect to a direction along which the two bits adjacent to each other are arranged, the reading element covering the two bits.

17. The reproducing apparatus according to claim 12, wherein the reading element is configured with a magnetoresistive effect element of which a resistance value varies according to magnetic field intensity and a direction of a magnetic field.

* * * * *

UNITED STATES PATENT AND TRADEMARK OFFICE

CERTIFICATE OF CORRECTION

PATENT NO. : 8,023,214 B2
APPLICATION NO. : 12/585259
DATED : September 20, 2011
INVENTOR(S) : Takumi Yanagisawa et al.

It is certified that error appears in the above-identified patent and that said Letters Patent is hereby corrected as shown below:

Title Page and Col. 1

Correct title in item (54) on the first page of the patent to read as follow:

REWORK METHOD AND APPARATUS OF MAGNETIC RECORD MEDIUM INFORMATION

Signed and Sealed this
Eighth Day of November, 2011

David J. Kappos
*Director of the United States Patent and Trademark Office*